United States Patent [19]

Arnold

[11] Patent Number: 4,824,319

[45] Date of Patent: Apr. 25, 1989

[54] LOADER COUPLER

[75] Inventor: Carroll H. Arnold, Westminster, Mass.

[73] Assignee: Wain-Roy, Inc., Hubbardston, Mass.

[21] Appl. No.: 92,173

[22] Filed: Sep. 2, 1987

[51] Int. Cl.⁴ .............................................. E02F 3/81
[52] U.S. Cl. .................................. 414/723; 403/338; 403/374
[58] Field of Search ........................ 414/724, 723, 686; 172/272–275, 779, 797, 819, 822; 403/374, 338, 353

[56] References Cited

U.S. PATENT DOCUMENTS

| | | | |
|---|---|---|---|
| 3,556,323 | 1/1971 | Heimmermann | 414/723 |
| 3,934,738 | 1/1976 | Arnold | 414/723 |
| 4,281,721 | 8/1981 | Beales | 172/821 |
| 4,674,945 | 6/1987 | Hulden | 414/723 |

FOREIGN PATENT DOCUMENTS

| | | |
|---|---|---|
| 1431698 | 1/1969 | Fed. Rep. of Germany . |
| 1291284 | 11/1969 | Fed. Rep. of Germany . |
| 1784323 | 8/1971 | Fed. Rep. of Germany . |
| 1473271 | 2/1966 | France . |
| 2087349 | 5/1982 | United Kingdom . |
| WO86/07043 | 12/1986 | World Int. Prop. O. . |

OTHER PUBLICATIONS

Tink Inc. Advertisement.

Primary Examiner—Robert J. Spar
Assistant Examiner—Donald W. Underwood

[57] ABSTRACT

An integrated hydraulic quick change side tilting coupler for attaching and detaching a tool for use on wheel and track loaders and material handlers. A coupler frame is hingedly mounted at the end of the loader arm for swinging in a vertical plane actuated by the loader hydraulic system. A radius plate on the frame has an upwardly projecting curved rim adapted to engage two bearing points on the tool for mounting and dismounting the tool. A central pivot pin projects forwardly from the frame and fits a bore in the tool. The axis of the pin is on the focal point of curvature of the plate permitting pivoting of the tool and consequent side-tilting of the tool about that axis. When the frame is coupled to the tool the upper portion of the plate is locked in a retainer at the top rear of the tool. A pair of locking and tilt cylinders is mounted on the frame, their rods carrying trunions which are retracted and extended thereby. The trunions cooperate with locking pivot pins which extend rearwardly from the lower rear face of the tool. These pins are rotatably engaged in the trunions when the rods are extended and released when they are retracted. Hydraulic controls are provided for retracting and extending the rods for coupling and uncoupling and for simultaneously extending one rod and retracting the other for tilting the tool in either direction about the central pivot pin. Thus the same pair of cylinders performs both the functions of locking and unlocking the tool for coupling and de-coupling and of tilting the coupled tool either way.

20 Claims, 9 Drawing Sheets

LOADER COUPLER

This invention relates to an integrated hydraulic quick change coupler for attaching and detaching a tool for use on wheel and track loaders and materials handlers having an hydraulically operated loader arm and includes a feature permitting both locking the tool to the loader and tilting the tool by means of the same hydraulic mechanism.

BACKGROUND OF THE INVENTION

In materials handling and earth moving machinery it is highly desirable to provide means for quickly interchanging different tools, such as buckets, blades, hammers, forks, jib booms, grapples, brooms, etc., (collectively hereinafter referred to as "tool(s)". If such tools can be remotely latched and unlatched from the tractor cab without need for additional manpower so much the better.

There are various arrangements in the art for accomplishing this purpose but often they involve complex or unreliable mechanisms. None so far as I am aware provides for both locking the tool in place and thereafter tilting it sideways by the same hydraulic mechanism. In fact, all seem to require separate sets of cylinders to accompish these two results.

Accordingly, it is an object of the present invention to provide an improved and simplified quick change loader coupler with optional means for both locking the tool to the tractor and tilting the same by means of the same hydraulic mechanism.

SUMMARY OF THE INVENTION

In accordance with the invention there is provided a coupler for attaching and detaching a tool for use on wheel or track loaders and material handlers having an hydraulically operated arm, comprising a coupler frame hingedly mounted at the end of the arm adapted to be swung in a vertical plane by means on the arm, coacting raising and locking means on the frame and tool, coacting locating and pivotal means on the frame and tool beneath the raising and locking means, the coacting raising and locking means being adapted to engage each other as said frame and tool are moved into coupling engagement thereby raising the tool and locking the upper portion of the tool to the coupler frame, the coacting locating and pivotal means being adapted to become mutually engaged as coupling is completed and to remain engaged until decoupling, bearings mounted on the rear face of the tool for engagement with portions of the frame when coupled, locking means on the frame and tool beneath the locating and pivotal means for positively locking the lower portion of the tool to the frame after coupling, and means for engaging and disengaging the locking means to permit attachment to and detachment of the tool from the frame.

In preferred embodiments, the locating and pivotal means comprises a tapered central pivot pin mounted on one of the frame and tool and a cooperating socket on the other thereof for receiving the pin; the coacting raising and locking means comprises a radius plate mounted on the frame in a plane generally parallel to that of the frame and forwardly thereof and a receptacle mounted on the top rear face of the tool to be coupled and adapted to receive and retain the upper edge portion of the radius plate as the coupler is moved into coupling engagement with the tool, thereby raising the tool and locking the upper portion of the tool to the coupler frame after coupling, the pivot pin being located at the focus of curvature of the radius plate, and the locking means beneath the locating and pivotal means comprises a pair of tool connection pivot pins extending rearwardly from the lower rear face of the tool to be connected and locking means on the frame adapted to engage the pivot pins to retain the lower portion of the tool in coupled engagement with the frame.

In a more preferred embodiment, means are provided on the ends of the last named pivot pins for preventing relative axial movement of the pins and locking means engaged therewith while the tool is coupled to the frame, the tapered surface of the central pivot pin is adapted to lift the tool as coupling is completed so as to disengage the curved surface of the radius plate from the bearings when the tool is coupled, hydraulic actuating mechanism is mounted on the frame and coacting means are provided on the frame and the rear face of the tool for actuation by the hydraulic mechanism for (a) locking the lower portion of the tool to the frame when coupled (b) unlocking the same for uncoupling and (c) for tilting the tool about the axis of the pivot pin while coupled.

Still further objects, features and advantages of the invention will become apparent from the following detailed description of preferred embodiments thereof taken in conjunction with the accompanying drawings.

DETAILED DESCRIPTION OF PREFERRED EMBODIMENTS

Embodiments with Side Tilting

Embodiments equipped with side tilting are illustrated in FIGS. 3-9.

Referring first to FIGS. 3-7, a presently preferred embodiment of the invention as applied to a loader bucket will be described. To the loader bucket arm 12 of a wheel or track loader (not shown) is attached a coupler frame 14, pivoted on pins 16 for swinging in a vertical plane actuated by loader bucket cylinder 18 and loader bucket link 20 in a manner well-known in the art. In the case of a materials handler an analagous mounting of the frame would be made. On the sides of frame 14 are mounted lock cylinders 22 and 24 having pistons and piston rods 30, 32, respectively. The rods carry at their ends bevelled downwardly facing locking trunions 26, 28 for up and down reciprocation when the rods are actuated by their respective cylinders 22, 24. The trunions when disengaged are prevented from accidental rotation by tracks or guides 25, 27. Forwardly of each trunion 26, 28 is a coupler end bearing 34, 36, respectively.

Figure 3:
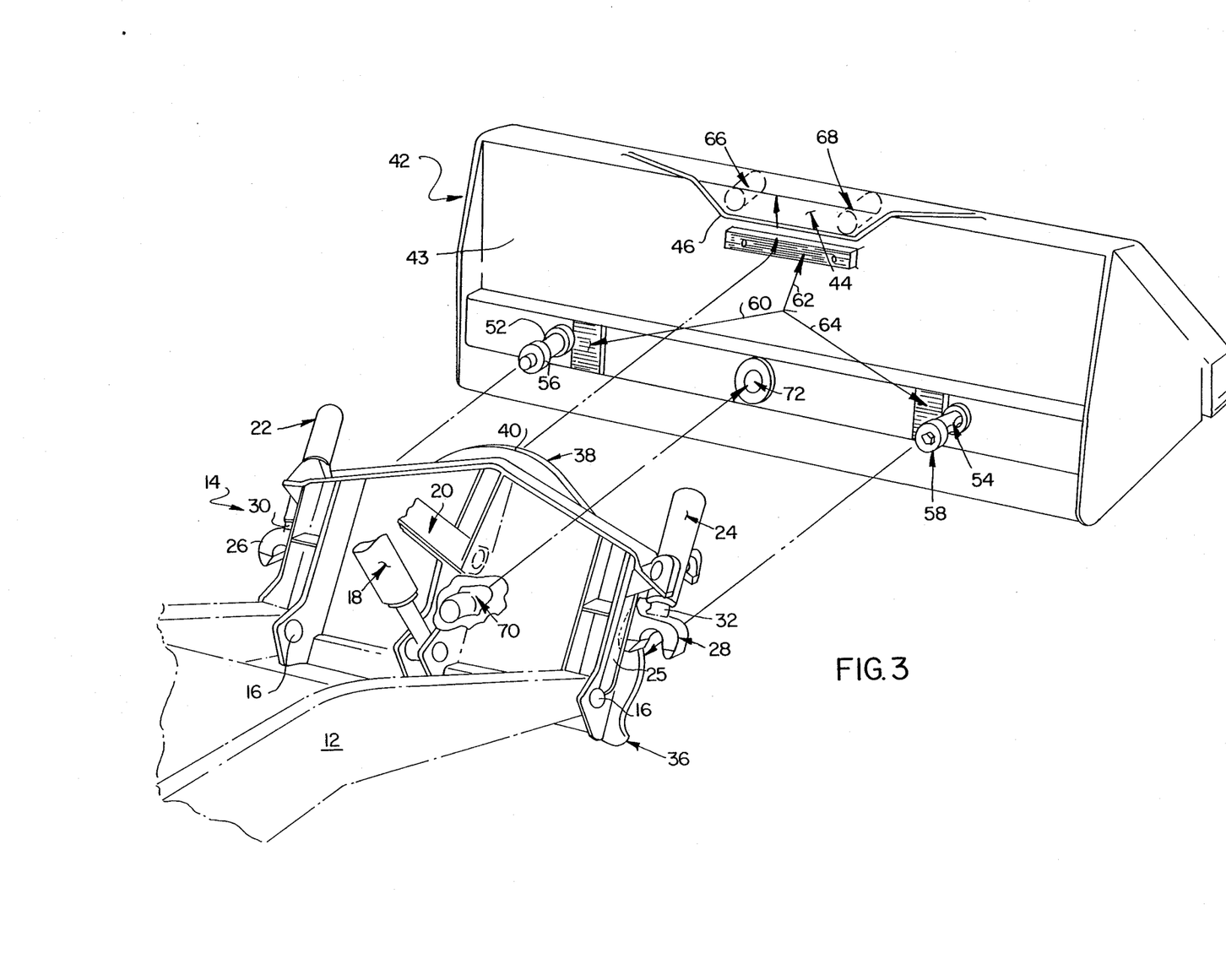
FIG. 3 is a view in perspective showing the parts of the novel coupler mechanism embodying the tilting feature as mounted on the end a loader bucket arm and on the rear face of the tool (bucket) separated from each other but preparatory to coupling.

Also on the front of the frame 14 and projecting upwardly from its top is a radius plate 38 having an arcuate upper rim 40 for a purpose below described.

The front side of frame 14 also carries a tapered coupler central pivot pin 70 located beneath the plate 38 and projecting forwardly of the frame.

Complementing the elements mounted on the frame 14 are cooperating members on tool 42, in this case a bucket to be attached to the frame 14 by means of the novel coupler. At the top of the rear face of the tool is securely mounted a radius plate receptacle 44 defined by a steel plate affixed to the top of the tool by welding or the like. It has a downwardly projecting skirt 46 defining with the rear surface 43 of bucket 42 the pocket or receptacle 44 having bearing 44A (FIG. 4) for receiving and retaining the top edge of plate 38 during and after the coupling procedure. Extending rearwardly from the lower portion of surface 43 are two mutually spaced tool connection pivot pins 52, 54 provided with adjustable shoulders 56, 58. Also mounted on the rear face of the tool are three tool face bearings 60, 62, 64 to be engaged by elements of frame 14 when the latter is fully coupled.

Figure 4:
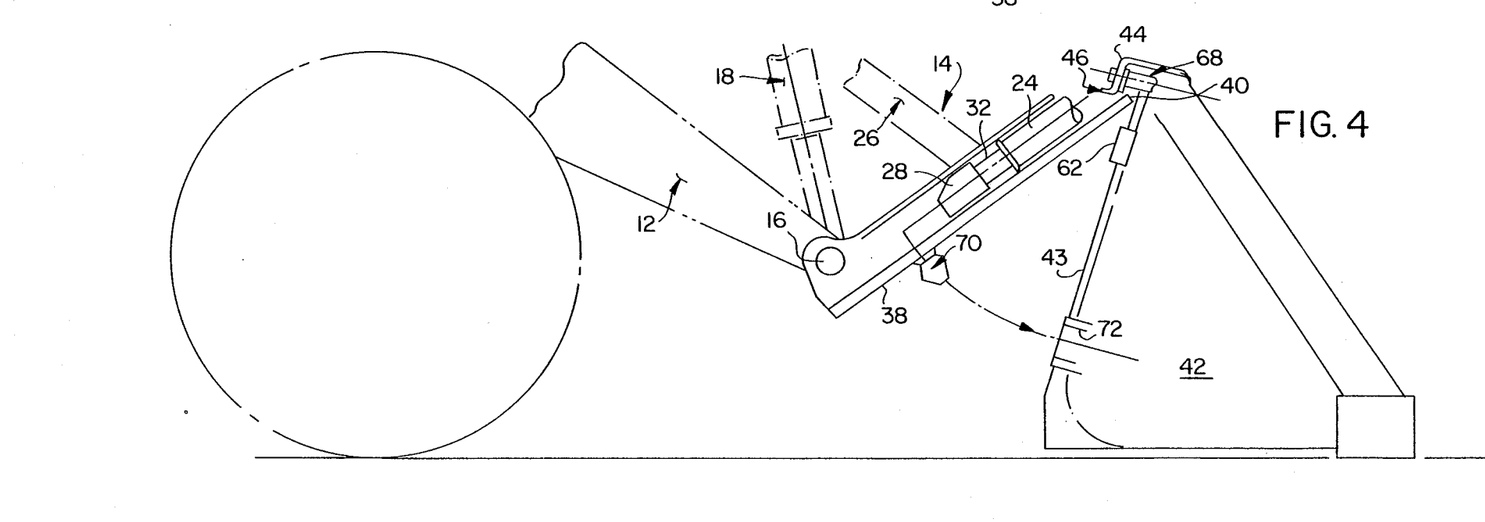
FIG. 4 is a side view of the embodiment shown in FIG. 3 showing how the respective parts of the coupler engage each other as coupling is initiated.

In order to accomplish the side tilting function, the tool 42 also is provided with a central pivot pin bore 72 which faces pin 70. Pin 70 is tapered, as best seen in FIG. 4, for the purpose hereinafter described. It is clear that these parts could be reversed, the pin being mounted on the tool and the bore provided in the frame.

Figure 7:
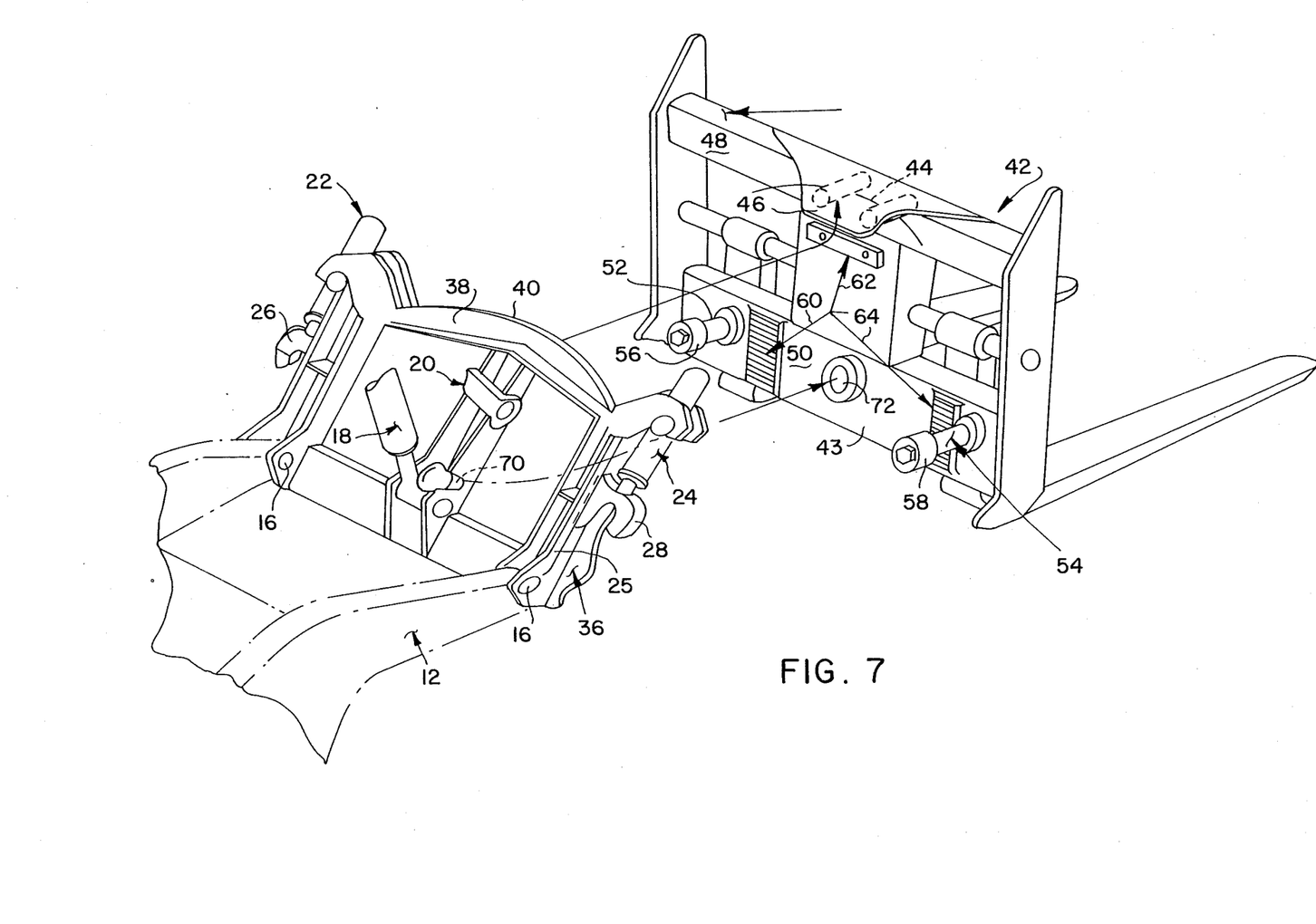
FIG. 7 is a view similar to FIG. 3 showing the coupler system of the invention as applied to attaching a fork instead of a bucket.

In FIG. 7 a fork tool has been substituted for the bucket of FIGS. 3-6. See description of FIG. 1 (infra).

The operation of the embodiments of FIGS. 3-9 is as follows, referring first to FIG. 4, assuming that the tool is resting on the ground in front of the loader, the latter is advanced with the frame 14 swung forwardly and downwardly a sufficient distance so that the rim 40 of plate 38 is below the bottom edge of skirt 46 of receptacle plate 44. Now the loader is moved ahead until the rim 40 is beneath skirt 46. Actuation of cylinder 18 now swings frame 14 upwardly and backwardly with plate 38 caught in the receptacle formed behind skirt 46 and with its rim bearing on the bottom surfaces of the pair of tool mounting bearings 66, 68 which project rearwardly from face 43 of tool 42 beneath skirt 46. Further pivoting of the frame lifts the tool and allows its face to swing against the face of frame 14. In this position (FIG. 5) the forward face of the frame 14 and the rearward face of tool 42 are approximately parallel and the rear of rim 40 bears against inside of lip 46 and end bearings 34, 36 engage bearings 60, 64. As coupling is completed tapered pin 70 enters socket 72 thereby lifting the tool 42 with respect to the frame 14 and thereby disengaging the rim 40 of radius plate 38 from the bearings 66, 68 while the tool is in use.

To lock the tool on to the frame cylinders 22 and 24 are successively actuated (FIGS. 5 and 6) extending trunions 26, 28 downwardly to engage pins 52, 54 between their respective shoulders 56, 58 and the face of the tool 42. To release the tool, the procedure is reversed. First, the trunions are retracted. With the tool resting on the ground, the loader is backed away as the frame 14 is swung forwardly, thus releasing the cooperating locking elements from each other. The operation of the FIG. 7 embodiment is the same as for FIGS. 3-6.

Side Tilt Actuation

Turning now to the side tilt actuation feature, when the trunions 26, 28 are locked behind shoulders 56, 58 on pins 52, 54, it is apparent that tool 42 cannot be detached from the frame 14, being held at the bottom by the shoulders and at the top by engagement of plate 38 behind the lip 46 of member 44. At the same time, however, it can be seen that if one cylinder rod is extended and the other simultaneously retracted, the tool 42 will pivot on pin 70 one way or the other. Hydraulic control means are provided to accomplish this function as will now be described.

Figure 10:
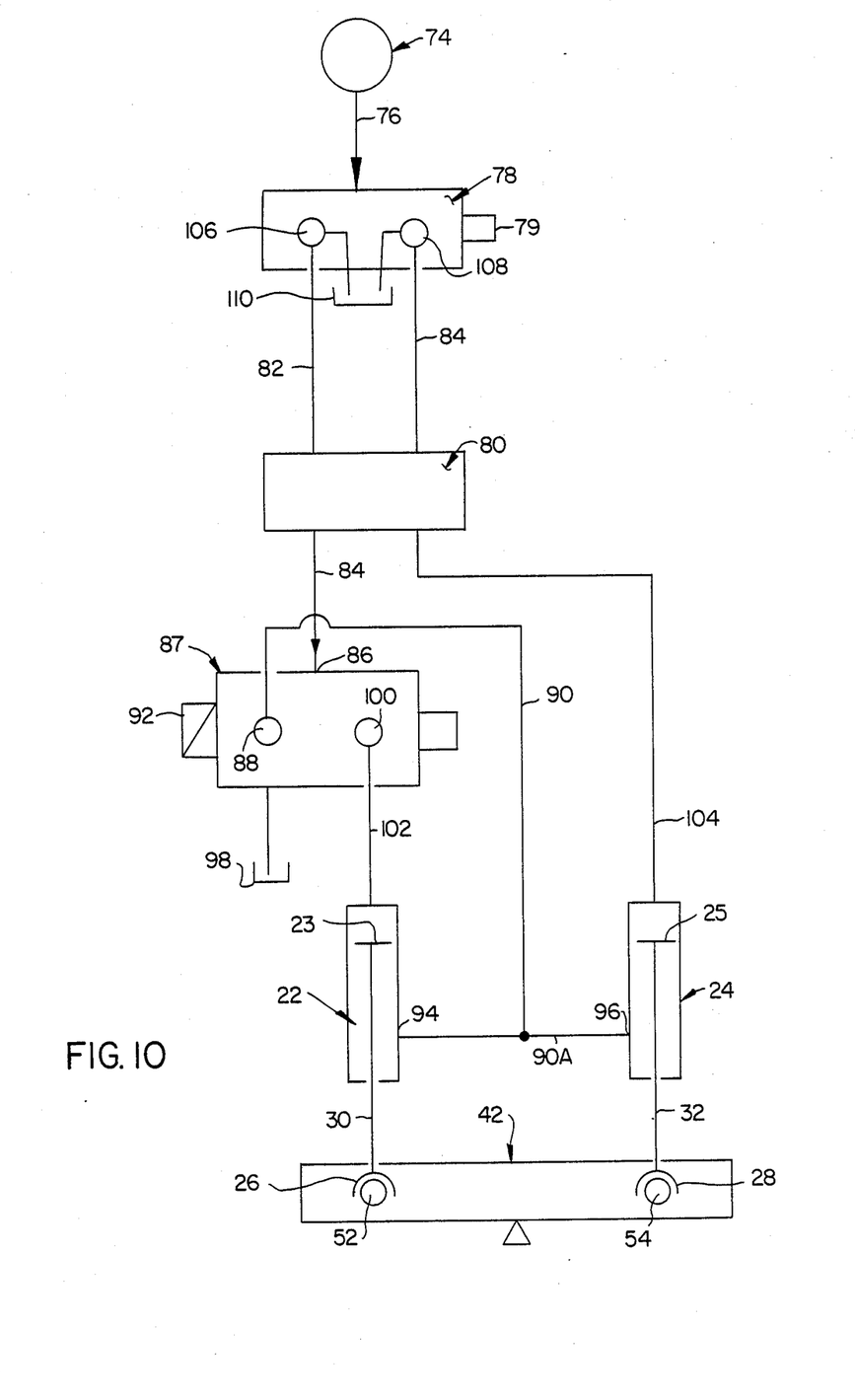
FIG. 10 is a schematic of one hydraulic control and actuating mechanism suitable for use with the invention, although other known hydraulic mechanisms may be employed.

Referring to FIG. 10, the loader or materials handler is provided with an hydraulic system actuated by oil furnished under suitable pressure by pump 74. Oil is delivered from pump 74 through line 76 to valve 78 which is single spool valve, four-way spring centered, operated manually or electrically as desired, the spool stem being indicated by the numeral 79. Oil may be delivered selectively through lines 82 or 84 to valve 80, a motion control valve provided with cross-over cylinder reliefs. All valves used in carrying out the invention are conventional and standard in the industry.

Communicating with valve 80 through line 84 and inlet port 86 is a four-way solenoid operated valve spool 87, spring biased at full extension for normal tool operation and adapted when the solenoid is energized to shift the valve spool to the opposite extreme. Valve 87 is provided with two work ports in addition to port 86. Work port 88 opens into line 90 which, in turn, communicates with the lower chambers of both cylinders 22 and 24 through ports 94 and 96. When solenoid 92 is actuated for tool removal, port 86 is placed in communication with line 90 through port 88. Oil discharging from cylinder 22 travels through line 102 to port 100 to tank 98. When the solenoid valve is not actuated, work port 86 communicates with work port 100 through line 102 to the driving chamber of cylinder 22. The driving chamber of cylinder 24 is connected directly to motion control valve 80 through line 104. Work ports 106 and 108 of spool valve 78 may be alternately shifted by operation of the valve spool to discharge oil into tank 110, as will be explained below.

Mode of Operation of Hydraulic System

Coupling is initiated with both cylinders 22, 24 fully retracted. After the tool 42 has been picked up and swung against the frame 14 so that the bevelled locking trunions 26, 28 are in alignment with the shouldered pivot pins 52, 54, the hydraulic controls are actuated to extend the piston rods of cylinders 22, 24, one after the other, into locking engagement with the pivot pins. Oil may be first introduced through lines 82, 84 and 102 to engage trunion 26 with its pin 52, and then introduced through lines 84 and 104 to engage trunion 28 with pin 54. Once locked to their respective pins, the rods of both cylinders remain so engaged until it is desired to detach the tool from the frame.

To accomplish detachment of the tool, by appropriate adjustment of the several valves, oil is fed through lines 82, 84, port 88 and line 90 to the lower chambers of the cylinders. This causes the cylinder pistons to simultaneously retract, the oil in the upper end of cylinder 22 being discharged into tank 98 and the oil from the top of cylinder 24 being discharged through lines 104 and 84 into tank 110, which may be the same tank as tank 98.

In accordance with the side tilting function, to tilt tool 42 clockwise, as seen in FIG. 10, oil is fed to the upper chamber of cylinder 24 by appropriate adjustment of the control valves. This causes rod 32 to extend. This action forces a corresponding amount of oil from beneath the piston 25 to discharge through port 96 and through line 90A into the lower chamber of cylinder 22 through port 94. The geometry of the cylinders is chosen so as to be equal throughout tool rotation. Equal cylinder displacement allows the oil to be transferred from one cylinder to the other during tilting in either direction or during overload or when in a tool "float" grading mode, while at the same time the rods remain tightly engaged with the tool connection pivot pins.

For side tilting in the opposite direction, the oil is fed through lines 82, 84 and 102 to the upper part of cylinder 22, thus extending rod 30 and rocking tool 42 counterclockwise. Again, oil forced from the lower chamber of cylinder 22 is transferred into the lower chamber of cylinder 24 through line 90A.

Alternative Tilting Mechanisms

Figure 8:
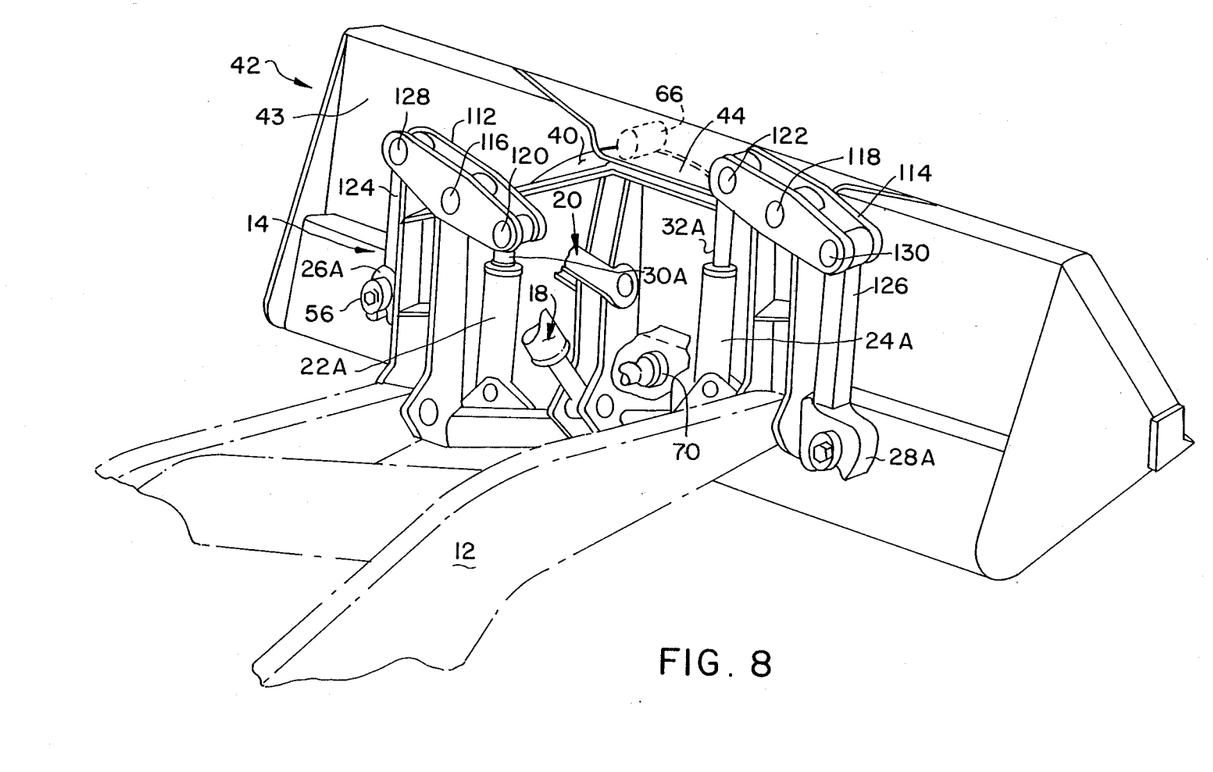
FIG. 8 is a view similar to FIG. 6 of another embodiment of the invention with side tilting feature employing hydraulically actuated rocker arms in place of direct actuation from cylinder rods.

Referring to FIG. 8, in this form of the invention a pair of vertical cylinders 22A and 24A is mounted on the frame 14. Rods 30A, 32A are directed upwardly, instead of downwardly as in the previous embodiment. Rocker arms 112, 114 are pivoted on pins 116, 118. The inboard ends of arms 112, 114 are pivoted to rods 30A, 32A by pins 120, 122 and the outboard ends are pivoted to arms 124, 126 by pivot pins 128, 130.

In this form of the invention arms 124, 126 have replaced the direct connection of the cylinder rods to the bevelled rod trunions. The latter are reciprocated by actuation of the cylinders in an analagous manner into and out of locking engagement with the tool connection pivot pins on the tool as before. Manifestly, when one cylinder rod is extended its rocker arm depresses that side of the tool, tilting it accordingly.

Attaching and detaching of the tool to the frame are accomplished as in the previous embodiment.

Figure 9:
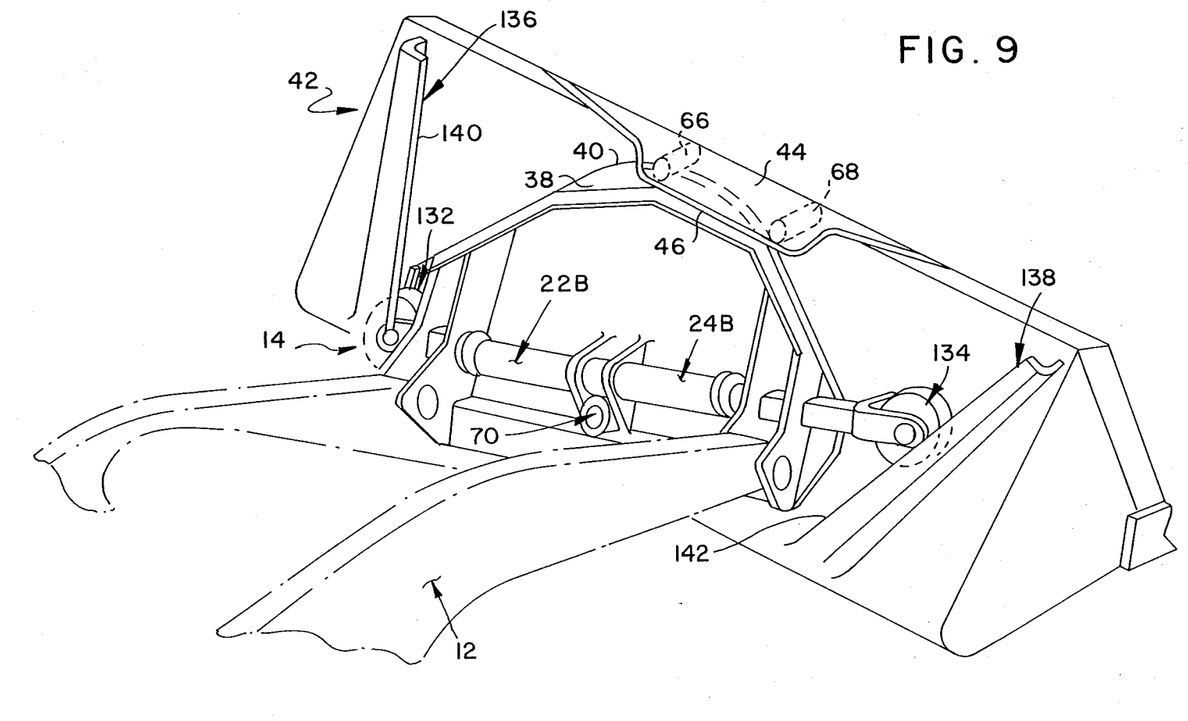
FIG. 9 is a view similar to FIG. 8 illustrating a still different embodiment with side tilting employing two double acting cylinders and roller-cam arrangement to accomplish tilting.

FIG. 9 illustrates a still further modified form of locking and tilting mechanism according to the invention. A pair of cylinders 22B and 24B, shown mounted horizontally end to end, replaces vertically arranged cylinders of the previously described embodiments. At the ends of the rods of these cylinders are mounted rollers 132, 134 adapted to roll in tracks 136, 138, respectively. It is clear that vertical mounting of these cylinders is possible with suitable alternative track arrangement, if desired.

The coupler serves to couple the tool 42 to the frame 14 as in the previous embodiments, the pin 70 seating in the bore formed in the tool 42, as before, and serving as a pivot for side tilting. In this embodiment the cylinder rods are retracted during coupling and decoupling. Once the tool has been swung flush against the surface of the frame 14, the rollers 132, 134 are extended into engagement with their respective inclined tracks 136, 138.

The mode of operation then becomes similar to that of the previous embodiments. When the rod of cylinder 24B is extended roller 134 rolls up track 138, tilting the tool clockwise. The hydraulic system is analagous to that of the previous embodiment, the oil displaced from the outer chamber of cylinder 24B being transferred to the outer chamber of cylinder 22A, thus permitting its rod to retract an equal distance and roller 132 to roll downwardly in track 136 a corresponding distance.

The tool 42 in this embodiment remains locked to the frame during operations by reason of the side walls 140, 142 which retain the rollers in the tracks.

Couplers without Side Tilting

Figure 1:
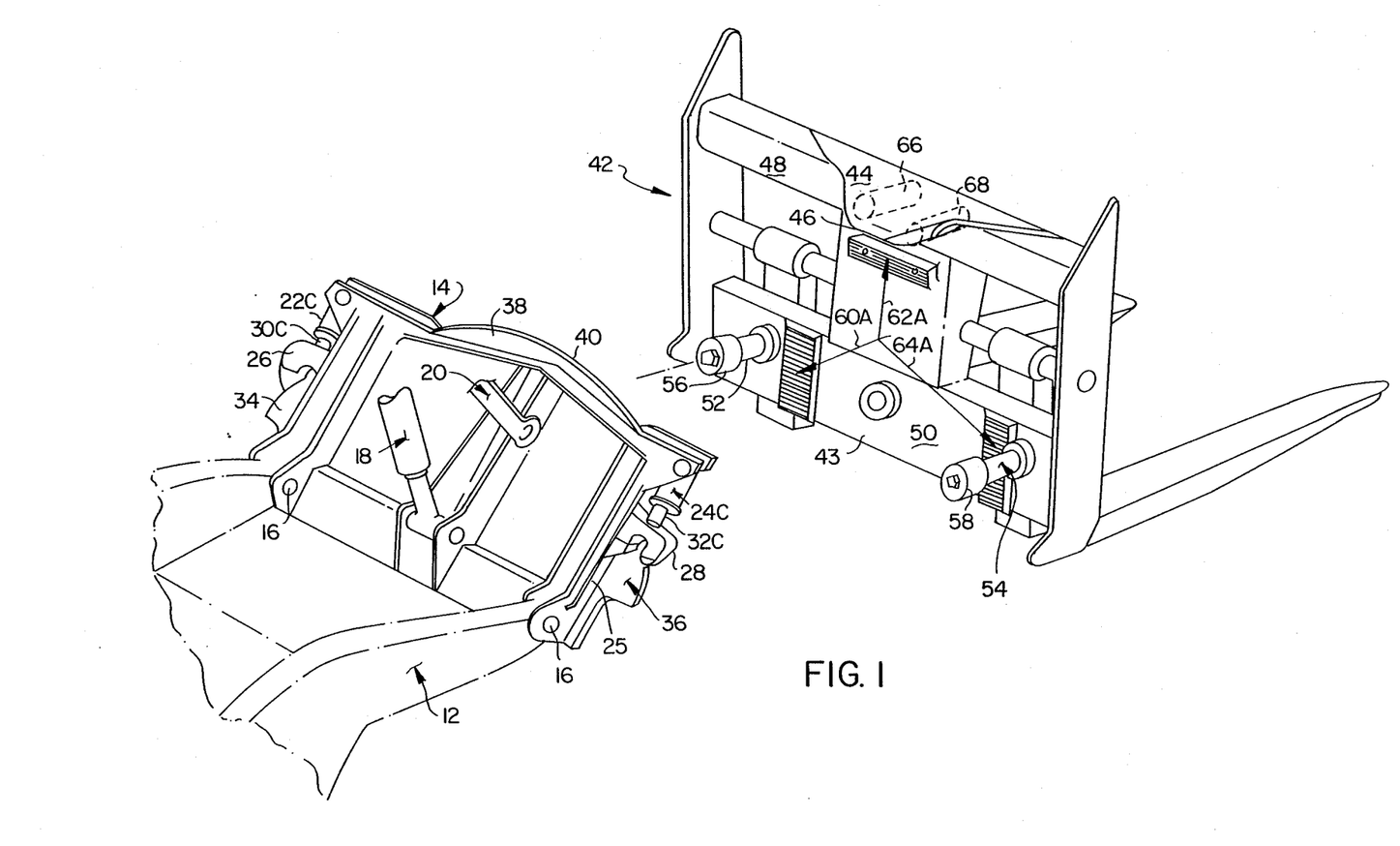
FIG. 1 is a view in perspective showing the parts of one form of the novel coupler of the invention, not embodying the tilting feature, as mounted on the end of a loader bucket arm and on the rear face of a tool (in this case a fork) to be coupled thereto.
Figure 2:
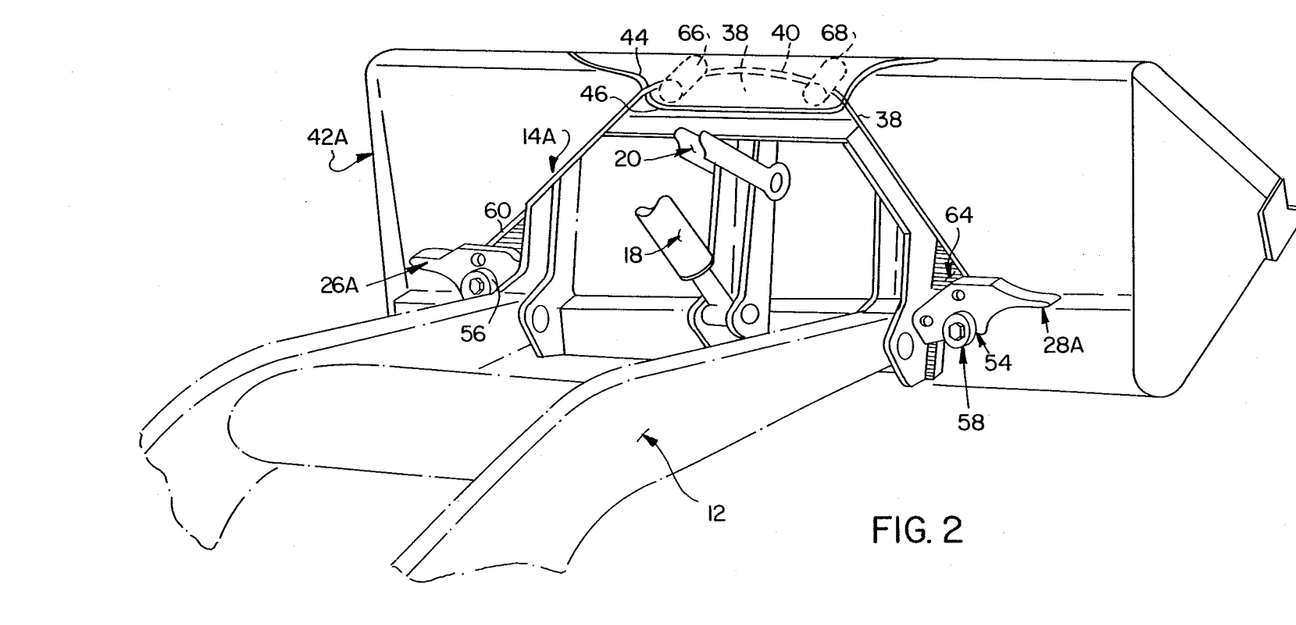
FIG. 2 is a view in perspective showing a modified coupler of the invention as applied to a bucket coupled to the end of a loader arm again not embodying the side tilting feature and employing manual rather than an hydraulically operated locking mechanism.

FIGS. 1 and 2 illustrate two embodiments of the coupler of the invention without the side tilting feature.

Turning first to FIG. 1, the loader bucket arm 12 of a wheel or track loader (not shown) is shown. To the end of the arm is attached a coupler frame 14, pivoted on pins 16 for swinging in a vertical plane actuated by loader bucket cylinder 18 and loader bucket link 20 in a manner well-known in the art. On the sides of frame 14 are mounted lock cylinders 22C and 24C having bevelled downwardly facing trunions 26, 28 fastened to the piston rods 30C, 32C for up and down reciprocation when actuated by their respective cylinders. Forwardly of each trunion 26, 28 is a coupler end bearing, 34, 36, respectively. The cylinders and rod of this embodiment are abbreviated in length as compared to those of the previously described embodiments since they are not called upon to perform a side tilting function but only a locking function.

Also on the front side of the frame 14 and projecting upwardly from its top is a radius plate 38 having an arcuate upper rim 40 for the same purpose as in the previously described embodiments.

Complementing the elements mounted on the frame 14 are cooperating members on tool 42, in this case a fork to be attached by means of the novel coupler. At the top of the rear face of the tool is securely mounted a radius plate receptacle 44 formed by a steel plate affixed to the top of the tool by welding or the like. It has a downwardly projecting skirt 46 defining with the rear surface of upper cross member 48 a pocket or receptacle for receiving and holding the top edge of plate 38 during and after the coupling procedure. Extending rearwardly from the face 43 of lower cross member 50 are two mutually spaced tool connection pivot pins 52, 54 provided with adjustable shoulders 56, 58. Also mounted on the rear face of the tool are three tool face bearings 60A, 62A, 64A to be engaged by elements of frame 14 when the latter is fully coupled but not for the purpose of permitting relative rotary motion.

The coupling and decoupling operation of this embodiment is the same as the previous embodiments and will not be again described. When the tool has been swung against the frame the face of the frame 14 and the rearward face of tool 42 are parallel and the front of plate 40 bears against bearing 62A and end bearings 34, 36 engage bearings 60A, 64A.

Figure 5:
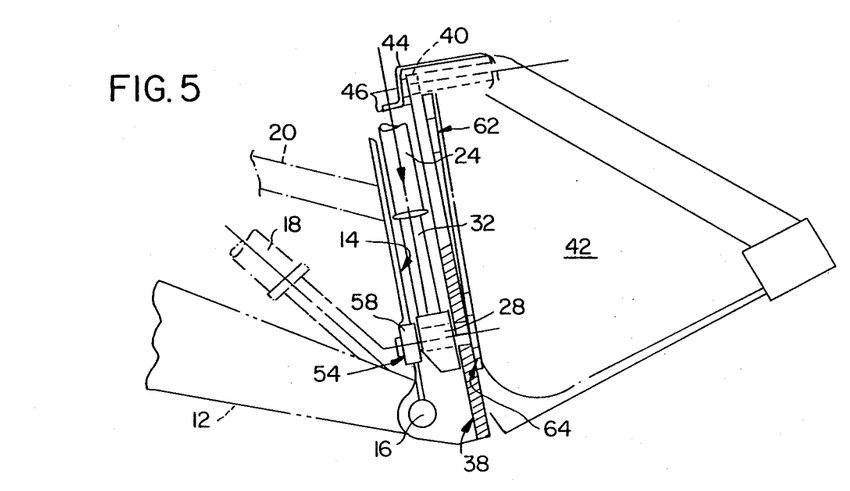
FIG. 5 is a similar view of the same after coupling is completed.
Figure 6:
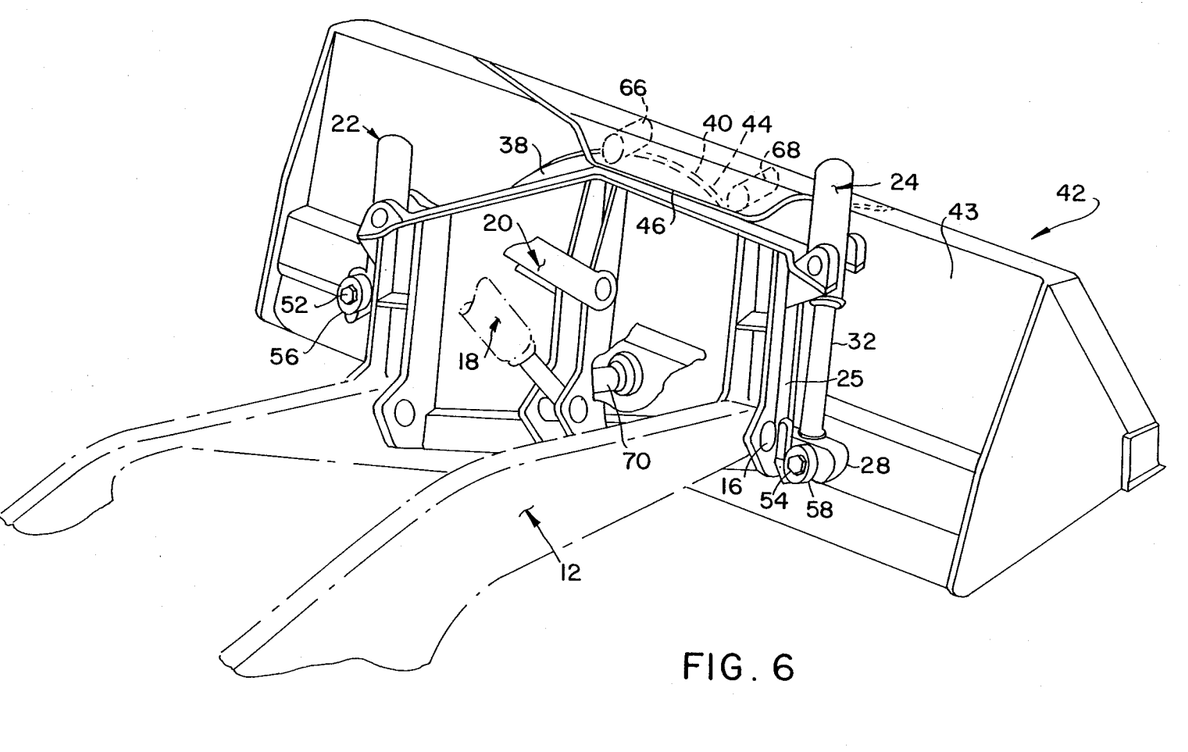
FIG. 6 is a view in perspective of the embodiment of FIGS. 4 and 5 in the condition as seen in FIG. 5.

To lock the tool onto the frame, cylinders 22C and 24C are actuated in succession, extending downwardly trunions 26, 28 which engage pins 52, 54 forwardly of their respective shoulders 56, 58. Referring to FIGS. 4 and 5, it will be seen that the locking is essentially the same as for the side tilting versions of the novel coupler. To release the tool, the procedure is reversed. First, the cylinders retract the trunions 26, 28. With the tool resting on the ground, the loader is backed up and the frame 14 swung forwardly, thus releasing the cooperating locking elements from each other.

In this embodiment, once locked to the arm 12, the tool 42 can be raised and lowered and pivoted on pins 16, but cannot be tilted sideways.

Alternate Non-Tilting Embodiment

This embodiment is shown in FIG. 2 wherein like numerals refer to like parts. In this case manual locking devices replace the cylinder actuated locks of the previously described embodiment.

As shown in FIG. 2, the tool is a bucket 42A in place of a fork, as in FIG. 1. When the plate 38 advances into the receptacle 44 behind skirt 46 and lifts the tool 42A by bearings 66, 68 so that it can be swung against the face of the frame 14A the levers 26A, 28A are in raised position (not shown) so that the tool connection pivot pins can advance beneath them. When the rear face of the tool is flush with the front face of the frame the two levers are manually swung to locking position with the shoulders 56, 58 engaging the levers and preventing displacement of the tool.

The disconnect procedure is the same as in the FIG. 1 embodiment except that the levers 26A, 28A are manually raised to release the tool connection pivot pins.

SUMMARY OF FEATURES

The invention provides the first tractor loader offering an integrated hydraulic quick change side tilting means; the coupling mechanism is light weight and close-coupled when engaged. Buckets, blades, hammers, forks, jib booms, grapples, brooms, etc., can be remotely latched and unlatched from tractor cab. The side tilt mechanism is built in as an integrated part of the coupler without the incorporation of additional hydraulic cylinders or structures. A single pair of hydraulic cylinders not only locks the tools on, but also tilts them approximately 12 degrees to either side (24 degrees total rotation) which permits establishment of new grades by tilting the bucket, i.e., road building, ditching, landscaping, etc. This is not possible with current state of the art rigid mounted quick couplers.

When fully tilted to either side, angle dozing can be accomplished by rolling the bucket leading edge to a vertical position. In the tilted position, compacted materials are easily penetrated by the corners of the bucket and it is also easier to get under rocks, concrete slabs or asphalt slabs.

When transporting pipe, building materials, etc., on side hills, especially when utilizing forks, the objects can be leveled to prevent spillage. Also, objects can be placed on surfaces which are laterally nonparallel to the tractor loader. When equipped with forks, the fork tips can be tilted to get under unparallel objects, i.e., pallets, pipes, logs, etc.

The hydraulic flow control valve compensates for pin joint wear and keeps the hydraulic cylinder trunnions tightly engaged. Cylinder crossover relief valve protection prevents structural damage by allowing excessively high pressure oil to exhaust from one cylinder to the opposite cylinder while keeping both cylinders tightly engaged. The hydraulic circuit allows the coupler tilt cylinders to simultaneously retract for tool disengagement or to extend for tool engagement; the inadvertent disengagement of one cylinder will not release a tool. Both cylinder rod trunnions must be retracted to clear the tool connection pivot pin shoulders.

While there has herein been disclosed and described a presently preferred embodiment of the invention, it will nevertheless be understood that the same is by way of illustration and not by way of limitation, and it is intended that the scope of the invention be limited only by the proper interpretation to be afforded the appended claims.

I claim:

1. A coupler for attaching and detaching a tool for use on wheel or track loaders and material handlers having an hydraulically operated arm, comprising
    a coupler frame hingedly mounted at the end of said arm and adapted to be swung in a vertical plane by means on said arm,
    a radius plate mounted on said frame in a plane generally parallel to that of said frame and forwardly thereof,
    a central pivot pin mounted on said frame below said plate and extending forwardly of said frame,
        said pin being at the focal point of curvature of the rim of said radius plate,
    a receptacle mounted on the top rear face of the tool to be coupled and adapted to receive and retain the upper edge portion of said radius plate as the coupler is moved into coupling engagement with said tool thereby raising said tool and locking the upper portion of the tool to the coupler frame after coupling,
    means providing a central pivot pin bore in the lower rear face of said tool adapted to receive said central pivot pin during coupling and to pivotally retain the same while the tool is coupled,
    bearings mounted on the rear face of said tool within said receptacle for engagement with the curved surface of said plate during coupling,
    tool connection pivot pins extending rearwardly from the lower rear face of the tool to be connected,
    locking means on said frame adapted to engage said pivot pins to retain the lower portion of said tool in coupled engagement with said frame, and
    shoulder means on the ends of said pins for preventing relative axial movement of said pins and locking means while the tool is coupled to the frame.

2. The coupler of claim 1 wherein said central pivot pin carries means for lifting said tool as coupling is completed so as to disengage said curved surface of said plate from said bearings when said tool is coupled.

3. An integrated hydraulic quick change side tilting coupler for attaching and detaching a tool for use on wheel and track loaders and material handlers having an hydraulically operated arm comprising a coupler frame hingedly mounted at the end of said arm and adapted to be swung in a vertical plane by means on said arm, hydraulic actuating mechanism mounted on said frame, a radius plate on said frame having an upwardly projecting curved rim, a central pivot pin mounted on one of said frame and tool at a level below said plate and means providing a pivot pin bore in the other of said frame and tool facing said pin and adapted to receive it as coupling is completed and to permit said tool to be pivoted about the same while the tool is so coupled, said pin being at the focal point of curvature of said curved rim, a receptacle mounted on the top rear face of said tool and adapted to receive and retain the upper rim portion of said radius plate as the coupler is moved into coupling engagement with said tool thereby raising said tool and locking the upper portion of the tool to the coupler frame after coupling, bearings mounted on the rear face of said tool within said receptacle for engagement with the curved rim of said plate during coupling, coacting means on said hydraulic mechanism and the rear face of said tool for both locking the lower portion of said tool to said frame when coupled and for tilting said tool about said pivot pin.

4. The coupler of claim 3 wherein said central pivot pin carries means for lifting said tool as coupling is completed so as to disengage said curved surface of said plate from said bearings while said tool is coupled.

5. An integrated hydraulic quick change side tilting coupler for attaching and detaching a tool for use on wheel and track loaders and material handlers having an hydraulically operated arm comprising a coupler frame hingedly mounted at the end of said arm and adapted to be swung in a vertical plane by means on said arm, a pair of horizontally mutually spaced generally vertically arranged tilt cylinders having downwardly directed cylinder rods mounted on said frame, a radius plate mounted on said frame in a plane generally parallel to that of said cylinders and forwardly thereof, cooperating pivot pin and bore means on said frame and tool at a level beneath said plate and facing each other, said bore being adapted to receive said pin as coupling is completed and to permit said tool to be pivoted about the same while said tool is so coupled, said pin being at the focal point of curvature of the rim of said radius plate, a receptacle mounted on the top rear face of the tool to be coupled and adapted to receive and retain the upper edge portion of said radius plate as the coupler is moved into coupling engagement with said tool thereby raising said tool and locking the upper portion of the tool to the coupler frame after coupling, bearings mounted on the rear face of said tool within said receptacle for engagement with the curved surface of said plate during coupling, trunion means mounted on the end of each tilt cylinder rod arranged to be retracted and extended by said cylinders, locking pivot pins extending rearwardly from the lower rear face of the tool to be connected, said locking pins adapted to be rotatably engaged in said trunion means when said rods are simultaneously extended and to be released when they are simultaneously retracted, shoulder means on the ends of said pins for preventing relative axial movement of said pins and trunion means while the tool is coupled to the frame, and hydraulic control actuating means for retracting and extending said rods for coupling and uncoupling and for simultaneously extending one rod and retracting the other for tilting the tool in either direction about said pivot pin while it is coupled.

6. The coupler of claim 5 wherein said central pivot pin carries means for lifting said tool as coupling is completed so as to disengage said curved surface of said plate from said bearings while said tool is coupled.

7. A coupler for attaching and detaching a tool for use on wheel or track loaders and material handlers having an hydraulically operated arm, comprising a coupler frame hingedly mounted at the end of said arm adapted to be swung in a vertical plane by means on said arm, coacting raising and locking means on said frame and tool, coacting locating and pivotal means on said frame and tool beneath said raising and locking means, said locating and pivotal means comprising a tapered central pivot pin mounted on one of said frame and tool and a cooperating socket on the other thereof for receiving said pin, said coacting raising and locking means adapted to engage each other as said frame and tool are moved into coupling engagement thereby raising said tool and locking the upper portion of the tool to the coupler frame, said tapered central pivot pin and said socket adapted to become mutually engaged as coupling is completed and to remain engaged until decoupling, the taper of said pin being such as to lift said tool with respect to said frame as it enters said socket, bearings mounted on the rear face of said tool for engagement with portions of said frame when coupled, locking means on said frame and tool beneath said locating and pivotal means for positively locking the lower portion of said tool to said frame after coupling, and means for engaging and disengaging said locking means to permit attachment and detachment of said tool from said frame.

8. The coupler of claim 7 wherein said coacting raising and locking means comprises a radius plate mounted on said frame in a plane generally parallel to that of said frame and forwardly thereof and a receptacle including bearing means for engaging said radius plate mounted on the top rear face of the tool to be coupled and adapted to receive and retain the upper edge portion of said radius plate as the coupler is moved into coupling engagement with said tool thereby raising said tool and locking the upper portion of the tool to the coupler frame after coupling, said pivot pin being located at the focus of curvature of said radius plate.

9. The coupler of claim 7 wherein said locking means comprises tool connection pivot pins extending rearwardly from the lower rear face of the tool to be connected, locking mechanism on said frame adapted to engage said pivot pins to retain the lower portion of said tool in coupled engagement with said frame, and means on the ends of said pins for preventing relative axial movement of said pins and locking means while the tool is coupled to the frame.

10. The coupler of claim 8 wherein the tapered surface of said central pivot pin is adapted to lift said tool as coupling is completed so as to disengage said plate from said bearing means when said tool is coupled.

11. The coupler of claim 7 including
hydraulic actuating mechanism mounted on said frame and
coacting means on said frame and the rear face of said tool actuated by said hydraulic mechanism for locking (a) locking the lower portion of said tool to said frame when coupled (b) unlocking the same for uncoupling and (c) for tilting said tool about the axis of said pivot pin while coupled.

12. A tool adapted for quick attachment to and detachment from a wheel or track loader or material handler having an hydraulically operated arm, a coupler frame hingedly mounted at the end of said arm adapted to be swung in a vertical plane by means on said arm, a radius plate mounted on the upper portion of said frame in a plane generally parallel to that of said frame and forwardly thereof, said plate having an arcuate upper rim, means below said plate and generally at the focus of curvature of said rim for pivotally engaging said tool when coupled and means for locking the lower portion of the tool in face to face engagement with and parallel to the face of said frame when coupled, said tool having a receptacle mounted on its top rear face adapted to receive and retain said rim during and after coupling, centrally located complementary means located on said face below said receptacle for receiving and engaging said pivotally engaging means, spaced bearings mounted on said face providing bearing surfaces for engaging portions of the opposed face of said frame when said tool has been coupled to said frame in said face to face relationship, and complementary means for cooperating with said means for locking its lower portion to said face of said frame.

13. The tool of claim 12 wherein said pivotally engaging means comprises a tapered pin and said complementary means for receiving and engaging said pivotally engaging means comprises a pin-receiving socket.

14. The tool of claim 12 including bearings mounted within said receptacle for engaging said arcuate upper rim of said plate during coupling whereby said tool may be lifted and swung into said face to face engagement with said frame.

15. The tool of claim 12 wherein said complementary means for cooperating with said locking means comprises a pair of rearwardly directed spaced pivot pins adapted to be engaged by said locking means.

16. The tool of claim 14 wherein said pivotally engaging means comprises a tapered pin and said centrally located complimentary means comprises a pin receiving socket which is disposed and arranged to cooperate with said tapered pin on said coupler frame to lift said bearings mounted within said receptacle out of engagement with said rim when said tool is fully coupled.

17. The coupler of claim 7 wherein said coacting raising and locking means comprises
a member mounted on the upper portion of one of said frame and tool disposed and arranged when said frame and tool are in face to face relation to have its upper edge portion located above said faces, means defining a receptacle, including bearing means for engaging said edge portion during coupling, mounted on the upper portion of the face of the other of said frame and tool, whereby said tool is raised by the engagement of said bearing means with said edge portion as the coupler is moved into coupling engagement and said tool is further raised by the mutual engagement of said pivot pin and socket to disengage said bearing means from said edge potion when coupling is completed, said receptacle adapted thereafter to retain said edge portion of said member.

18. The coupler of claim 17 wherein said member is a radius plate and said edge portion comprises its rim, and said pivot pin is located at the focus of curvature of said plate.

19. The tool of claim 16 wherein said locking means includes pivotal actuating means arranged to cooperate with said pivot pins for pivoting said tool about said tapered pin.

20. A coupler for attaching and detaching a tool for use on wheel or track loaders and material handlers having an hydraulically operated arm, comprising
a coupler frame hingedly mounted at the end of said arm adapted to be swung in a vertical plane by means on said arm, coacting raising and locking means on said frame and tool, coacting locating means on said frame and tool beneath said raising and locking means, said locating means comprising at least one tapered pin mounted on one of said frame and tool and socket means on the other thereof for receiving and retaining said pin, said coacting raising and locking means adapted to engage each other as said frame and tool are moved into coupling engagement thereby raising said tool and bringing it into face to face engagement with said coupler frame while locking the upper portion of the tool to the frame, said locating pin adapted to remain engaged until decoupling, the taper of said pin being such as to lift said tool with respect to said frame as it enters said socket means, and bearings mounted on at least one of the mutually opposing faces of said tool and frame for engagement with portions of the other face when said tool is coupled in said face to face engagement.

* * * * *

UNITED STATES PATENT AND TRADEMARK OFFICE
CERTIFICATE OF CORRECTION

PATENT NO. : 4,824,319

DATED : April 25, 1989

INVENTOR(S) : Carroll H. Arnold

It is certified that error appears in the above-identified patent and that said Letters Patent is hereby corrected as shown below:

Fig. 10 should appear as shown on the attached sheet.

Col. 4, line 43, "84" should read -- 84A --.
Col. 5, line 12, "84" should read -- 84A --.
Col. 5, line 22, "84" should read --84A --.

Signed and Sealed this

Thirtieth Day of January, 1990

Attest:

JEFFREY M. SAMUELS

*Attesting Officer*    *Acting Commissioner of Patents and Trademarks*

FIG. 10